United States Patent
Bhuiya et al.

(10) Patent No.: US 9,335,987 B2
(45) Date of Patent: May 10, 2016

(54) DATA OBJECT WITH COMMON STATEMENT SERIES

(71) Applicant: International Business Machines Corporation, Armonk, NY (US)

(72) Inventors: Subhajit Bhuiya, Kolkata (IN); Pramod Chandoria, Hyderabad (IN); Vaibhav Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/100,412

(22) Filed: Dec. 9, 2013

(65) Prior Publication Data

US 2015/0160942 A1  Jun. 11, 2015

(51) Int. Cl.
G06F 9/44 (2006.01)
G06F 9/45 (2006.01)
G06F 11/36 (2006.01)

(52) U.S. Cl.
CPC .............. G06F 8/70 (2013.01); G06F 11/3684 (2013.01)

(58) Field of Classification Search
None
See application file for complete search history.

(56) References Cited

U.S. PATENT DOCUMENTS

| | | | | |
|---|---|---|---|---|
| 5,655,122 A * | 8/1997 | Wu | | 717/152 |
| 5,796,989 A * | 8/1998 | Morley et al. | | 703/26 |
| 6,381,739 B1 * | 4/2002 | Breternitz et al. | | 714/37 |
| 7,447,884 B2 * | 11/2008 | Mori | | G06F 9/3806 712/239 |
| 8,161,461 B2 * | 4/2012 | Delmonte | | G06F 11/3457 717/127 |
| 8,490,056 B2 | 7/2013 | Lau et al. | | |
| 2004/0221278 A1 * | 11/2004 | Dankel et al. | | 717/139 |
| 2006/0130012 A1 * | 6/2006 | Hatano et al. | | 717/136 |
| 2007/0079296 A1 * | 4/2007 | Li | | G06F 9/45516 717/136 |
| 2007/0096953 A1 * | 5/2007 | Odagiri | | 341/50 |
| 2007/0226700 A1 * | 9/2007 | Gal et al. | | 717/128 |
| 2008/0320462 A1 * | 12/2008 | Bergman et al. | | 717/168 |
| 2010/0115494 A1 * | 5/2010 | Gorton, Jr. | | 717/128 |
| 2012/0198342 A1 * | 8/2012 | Mahmud | | 715/733 |
| 2013/0041900 A1 | 2/2013 | McCoy et al. | | |
| 2013/0167116 A1 | 6/2013 | Mahmud | | |
| 2014/0289621 A1 * | 9/2014 | Sivakumar et al. | | 715/704 |

FOREIGN PATENT DOCUMENTS

EP  1164508 A2  12/2001

OTHER PUBLICATIONS

Ramesh C. Agarwal et al., Depth First Generation of Long Patterns, ACM, KDD '00 Proceedings of the sixth ACM SIGKDD international conference on Knowledge discovery and data mining, pp. 108-118.*

Bulychev et al., "An evaluation of duplicate code detection using anti-unification", Proceedings of the 3rd International Workshop on Software Clones, 2009. http://citeseerx.ist.psu.edu/viewdoc/download?doi=10.1.1.155.1970&rep=rep1&type=pdf.

(Continued)

Primary Examiner — Chat Do
Assistant Examiner — Douglas Slachta
(74) Attorney, Agent, or Firm — Stosch Sabo; Edward Choi (57) ABSTRACT

Various embodiments are directed to a computer implemented method for determining a largest common series of statements from one or more sets of ordered statements. A most common statement in the one or more sets of ordered statements is determined. A first order most common sequential statement following each most common statement is determined. The most common statement and the first order most common sequential statement are stored in a data object as the largest common series.

20 Claims, 5 Drawing Sheets

(56) References Cited

OTHER PUBLICATIONS

Devaki et al., "Efficient and flexible GUI test execution via test merging", ISSTA 2013: Proceedings of the 2013 International Symposium on Software Testing and Analysis, pp. 34-44, ACM New York, NY, USA © 2013. DOI: 10.1145/2483760.2483781.

Srivastava, "16048: As a user suggest me how to modularize my manual scripts", Blog Post, Project: Rational Quality Manager (RM), Jazz.net, created Jan. 28, 2013, Grace Period Disclosure. Formally posted at: https://jazz.net/rm/web#action=com.ibm.rdm.web.pages.showArtifact&artifactURI=https%3A%2F%2Fjazz.net%2Frm%2Fresources%2F_ARmVkGIFEeKxl-vbbSwGiA.

Srivastava, "Explore and create a Manual Test Script with RQM 4.0 (Beta)", Blog Post, Jazz.net, Posted Mar. 8, 2012. https://jazz.net/blog/index.php/2012/03/08/explore-and-create-a-manual-test-script-with-rqm-4-0-milestone-7/.

* cited by examiner

| Keyword Reference Links Table | | | |
|---|---|---|---|
| Potential Keyword ID | Script | Keyword_row Number | Script_step Number |
| 1 | A | 1 | 1 |
| 1 | B | 1 | 8 |
| 1 | X | 1 | 21 |
| 1 | A | 2 | 2 |
| 1 | B | 2 | 9 |
| 1 | A | 3 | 3 |
| 1 | B | 3 | 10 |
| 1 | A | 4 | 4 |
| 1 | B | 4 | 11 |

FIG. 5

| Potential Keywords Table | | |
|---|---|---|
| ID | Keyword Name | Content |
| 1 | Login to RQM | Login to RQM Enter username Enter password Click login button |
| 2 | | .... |
| 3 | | .... |

DATA OBJECT WITH COMMON STATEMENT SERIES

STATEMENT REGARDING PRIOR DISCLOSURES BY THE INVENTOR OR A JOINT INVENTOR

The following disclosure(s) are submitted under 35 U.S.C. §102(b)(1)(A): DISCLOSURE: "Blog Post", by Vaibhav Srivastava, Jan. 28, 2013, formally posted at Jazz.net.

FIELD

This disclosure relates generally to different yet ordered sets of operation statements in a system, more particular to finding the largest common series of statements from the sets.

BACKGROUND

Computer applications generally contain many lines of code of instructions or statements to perform a function of the computer application. Each series of statements may be contained in a set such as a file or script which when combined with other sets make up the computer application. Many statements repeat themselves throughout the sets. For instance, software testers often create test scripts to test different functions of an application under test. A test script generally includes statements such as a step-by-step process to invoke specific functions of the application and verify that the functions correctly perform the intended tasks. The test script for testing a particular function of the application may include the test scripts of common sub-processes used for other functions. These sub-processes are often referred to as subroutines or sub-tests. For example, test scripts for a Web application being tested may include a common sequence of steps for logging on to a Web site that include entering an ID and a password, and clicking on a "Login" button. Software testers may label such subroutines with keywords to uniquely identify them and facilitate the maintenance of the test scripts.

SUMMARY

Various embodiments are directed to a computer implemented method for determining a largest common series of statements from one or more sets of ordered statements. A most common statement in the one or more sets of ordered statements is determined. A first order most common sequential statement following each most common statement is determined. The most common statement and the first order most common sequential statement are stored in a data object as the largest common series.

In other embodiments, a computer system and a computer program product are configured to perform the method.

BRIEF DESCRIPTION OF THE DRAWINGS

In the Figures and the Detailed Description, like numbers refer to like elements.

DETAILED DESCRIPTION

Aspects of the present disclosure relate to different yet ordered sets of operation statements in a system, more particular to finding the largest common series of statements from the sets. Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of this present disclosure to such applications. The same numbers may be used in the Figures and the Detailed Description to refer to the same devices, parts, components, steps, operations, and the like.

Aspects herein provide for a system and a method of determining a largest common series of statements from a plurality of different sets of ordered statements. The system may determine a most common statement from the different sets of ordered statements and from those most common statements, determine a most common first order subsequent statement following each most common statement. A most common, second order, subsequent statement, following the most common first order subsequent statement, may be determined. This may repeat until there are no more subsequent statements or the most common subsequent statement has a count of one, thus forming a series of statements. This most common series of statements may be stored as a data object. The method may be repeated for the next most common statement that does not already belonging to a series forming a second series. In various aspects these series may be reused and identified by a keyword. One or more of the most common series of statements may be used to create a new set.

Various aspects of the present disclosure may relate to software applications and more specifically to test scripts for testing software applications. Software can include instructions, also referred to as statements herein, written with computer code. These statements may exist in different sets of statements such as files and scripts. These sets may make up the software application. Software applications may also be tested with other software applications. When testing a software application many different sets of ordered statements may be created to test the software application. These different sets may be referred to as test scripts and each statement within a test script may be a test step. There may be thousands of test scripts for a given system that may be used to test different applications. A series of steps within a test script may be used in other test scripts within the system. Determining the common series of steps and moving the common series of steps to a database of common series of steps may allow for reusability and maintenance of the steps across test scripts in the system. Each common series may be identified by a keyword.

Figure 1:
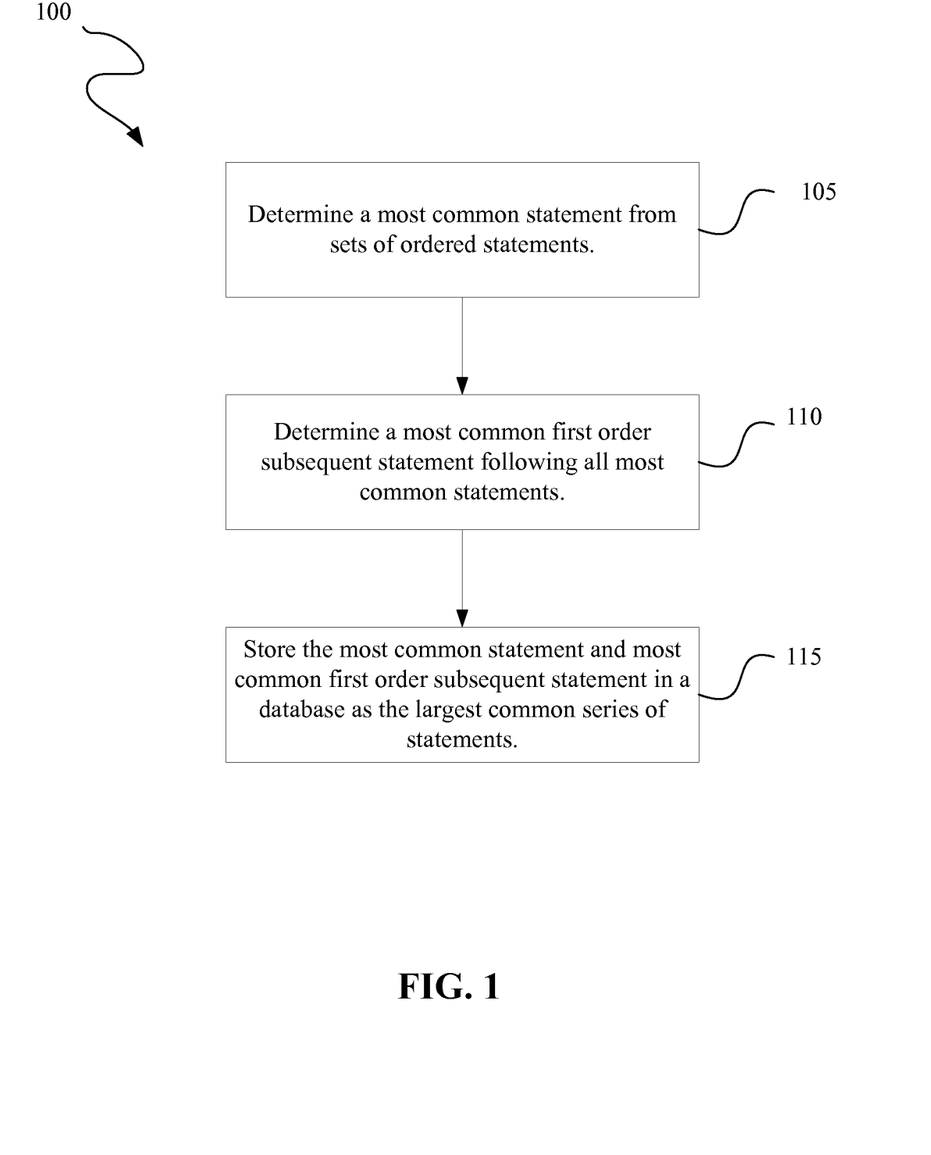
FIG. 1 illustrates a flow diagram of a method of determining a largest common series of ordered statements from a plurality of different sets of statements, according to various embodiments.

FIG. 1 illustrates a flow diagram of a method 100 of determining a largest common series of ordered statements from a plurality of different sets of statements, according to various embodiments. In operation 105, a set manager may determine a most common statement from the sets of statements. In operation 110, the set manager may then determine a first order, subsequent statement from each most common statement that is most common. In operation 115, the set manager may store the most common statement and the most common first order subsequent statement in a database as the largest common series of statements. The common series may be identified by a keyword, which may be a plain text of the most common statement. In applications such as steps in test scripts, method 100 may be used to create a database of a common series of steps used among test scripts in a particular system. This may allow for reusability of the steps across test scripts without modifying individual test scripts or creating test scripts from scratch.

Figure 2:
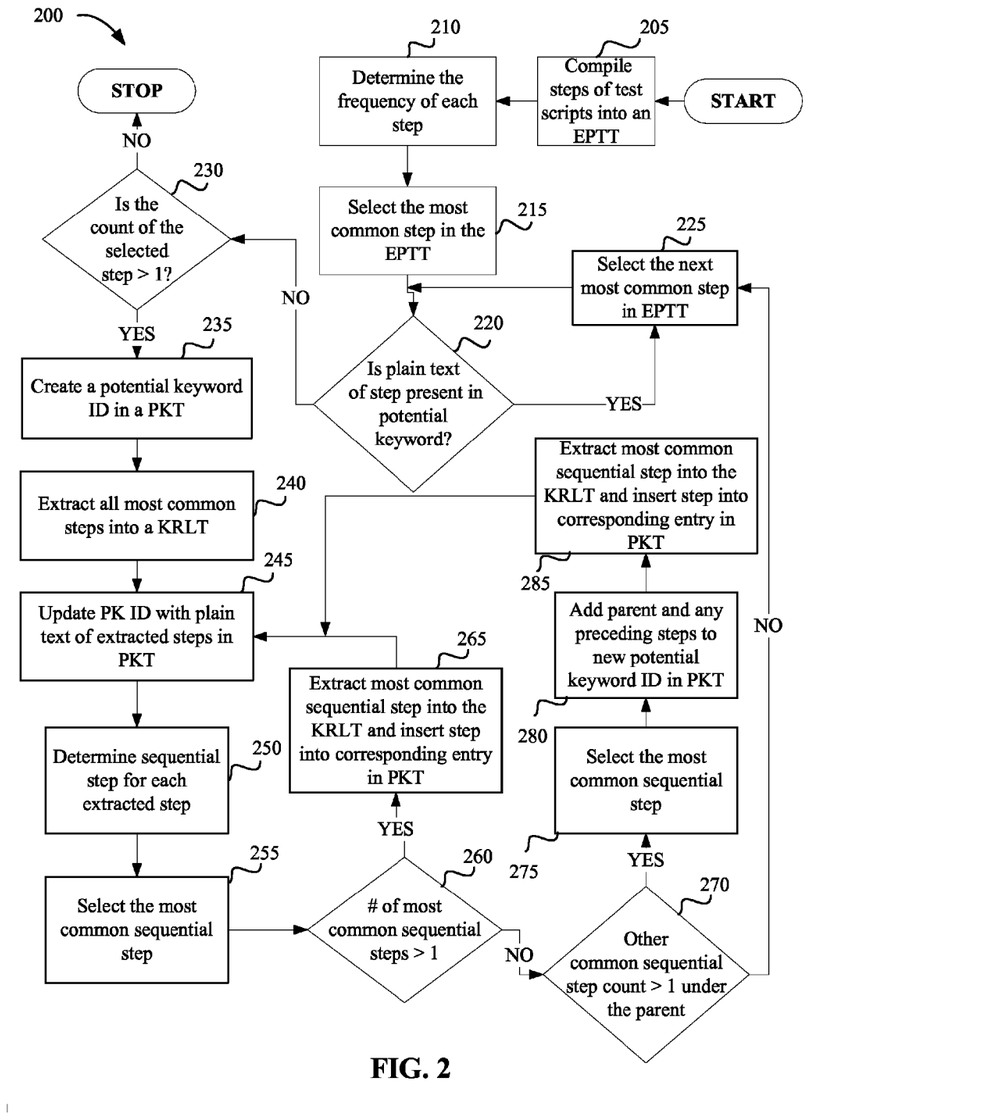
FIG. 2 illustrates a flow diagram of a method for determining a common series of statements from a plurality of sets of statements, according to various embodiments.
Figure 3:
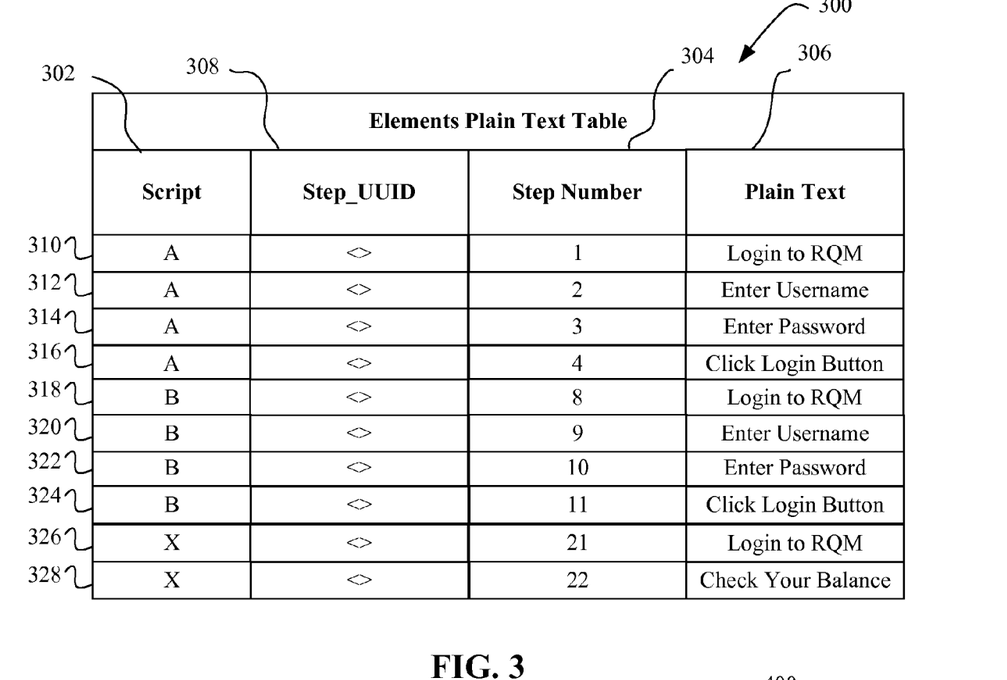
FIG. 3 illustrates an elements plain text table (EPTT), according to various embodiments.

FIG. 2 illustrates a flow diagram of a method 200 for determining a common series of statements from a plurality of sets of statements, according to various embodiments. The method 200 uses test scripts as an example of a set of statements and steps as an example of statements within the sets. In operation 205, a set manager may compile all of the test scripts or selected test scripts across a system into one or more of a plurality of data formats (e.g., tables, raw data, sequenced data) such as an Elements Plain Text Table (EPTT) 300 (as shown in FIG. 3) in various embodiments. In various embodiments, the EPTT may include the plain text of a plurality of steps of a plurality of test scripts. The EPTT is discussed further in the discussion for FIG. 3.

Figure 4:
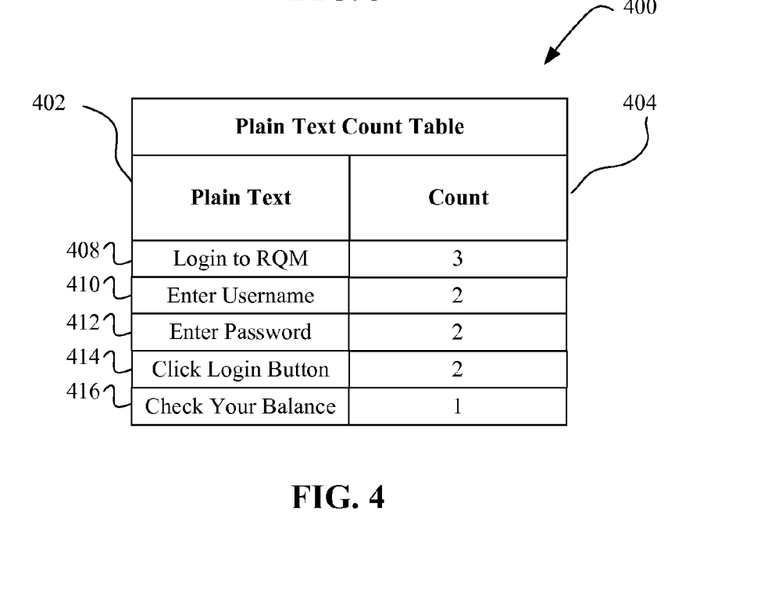
FIG. 4 illustrates a plain text count table (PTCT), according to various embodiments.

In operation 210, the set manager may use the information in the EPTT to determine the frequency of each step across the system. In various embodiments, the set manager may order the plain text into a data format such as a Plain Text Count Table (PTCT) 400 as shown in FIG. 4 from the most frequent plain text to the least frequent plain text. The PTCT 400 may include the plain text of each step and count of each plain text according to various embodiments.

In operation 215, the set manager may select the most common step listed in the PTCT 400. In operation 220, the set manager may determine whether the most common step selected is already used as a potential keyword in a potential keyword table (PKT) 600 as shown and discussed with FIG. 6. If the plain text of the steps is used in the PKT 600, then, in operation 225, the set manager may select the next most common step. The method may then continue to operation 220 again to determine whether the next most common step is used as a potential keyword in the PKT 600.

Figure 6:
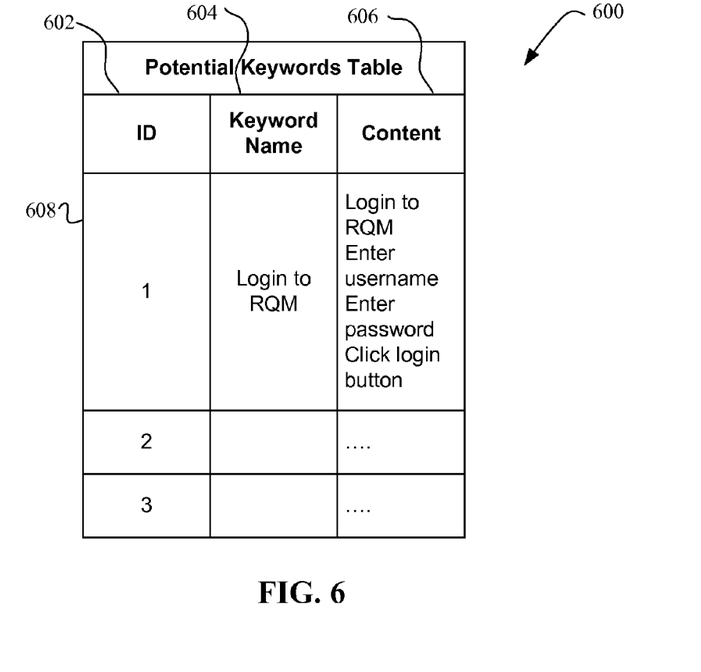
FIG. 6 illustrates the potential keywords table (PKT), according to various embodiments.

If the plain text of the step is not part of the PKT table 600, then method 200 may continue with operation 230. In operation 230, the set manager may determine whether the count of the selected most common step is greater than one. In other embodiments, a different count may be used. If the count of the selected most common step is not greater than one, then method 200 may end. If the count of the selected most common step is greater than one, then in operation 235, a potential keyword identifier may be created by the set manager for the most common steps. The potential keyword identifier may be an identifier which identifies the most common series of steps in the test scripts across a system.

Figure 5:
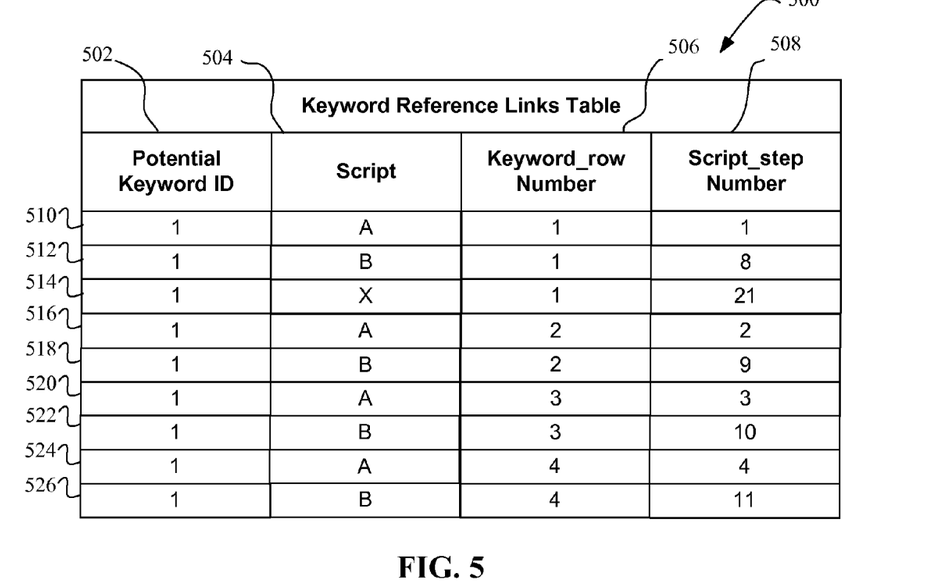
FIG. 5 illustrates a keyword reference links table (KRLT), according to various embodiments.

The method may continue to operation 240 where all of the steps of the most common steps may be extracted from the EPTT 300 and inserted into or copied into a data format such as a table. A Keyword Reference Links Table (KRLT) 500 as shown in FIG. 5 may be the table in which the most common steps are inserted. FIG. 5 is described further below. The KRLT 500 may include at least a potential keyword identifier, the script of the plain text, and the script step number, and the keyword row number which may be the position step is with relation to the potential keyword. In other embodiments, the most common steps may be inserted into a result table before inserting them into the KRLT 500. The result table may include at least the test script containing the plain text, the step number within the test script, and the plain text.

In operation 245, the potential keyword table PKT 600 may be updated with the potential keyword identifier 602 and also with the plain text of the most common extracted step under the potential keyword identifier. The PKT 600 may include the potential keyword identifier 602, the keyword name 604 (which may be the plain text of the most common step), and the content 606, which may include the plain text and plain text of sequential steps that may be determined later in the method 200.

In operation 250, for the last most common step that was extracted under a particular potential keyword identifier, the set manager may determine from the EPTT the sequential step following the previous extracted step. This may be done for all previous extracted steps.

In operation 255, of those sequential steps determined by the set manager, the set manager may select the most common sequential step. Most common may mean that the count of the same sequential step is greater than any other count of similar sequential steps.

In operation 260, the set manager may determine whether the count of the most common sequential steps is greater than one. If the count of the most common sequential step is greater than one, then, in operation 265, the set manager may extract the most common sequential steps from the EPTT 300 into the KRLT 500. In various embodiments, the extracted most common sequential steps may first be extracted into a result table and then the result table may be used to update the KRLT 500.

The method 200 may then continue back to operation 245 to update the potential keyword identifier in the PKT 600 with the plain text from the most common sequential steps. The first most common sequential steps may be referred to as the first order common sequential steps. After PKT 600 is updated in operation 245, then the method 200 may continue to 250 where the most common sequential step following the first order sequential step is determined. This step may be referred to as a second order most common sequential step. Each of these most common sequential steps may receive a keyword row number in the KRLT 500 which is the order they were extracted. For instance, the most common step, which may be referred to as a parent step, may get a keyword row number of 1. The most common sequential step (first order) may get a keyword row number of 2 and so on.

The method 200 may keep repeating this until the count of an nth order sequential step is not greater than one in operation 260. The method may continue to operation 270 where the set manager may determine whether there are any other common sequential step counts greater than one under the parent step. If there are any other common sequential step counts greater than one under the parent step, then, in operation 275, the most common sequential step with of the lowest order, (i.e. $1^{st}$ order, then $2^{nd}$ order, then $3^{rd}$ order), may be selected. In operation 280, a new potential keyword identifier may be created in the PKT 600. The set manager may add the parent step to the PKT 600. The set manager may also add any of the next ordered sequential steps that follow the parent step but that are before the selected sequential step to the PKT 600. The addition may include the plain text of the added steps. In operation 285, the selected most common step may be extracted from the EPTT 300 and into the KRLT 500. The method 200 may continue on to operation 245 where the potential keyword identifier may be updated with the plain text of the most common sequential extracted steps.

Returning to operation 270, if other sequential step counts are not greater than 1, then the method 200 may return to operation 225. The next most common step in the EPTT 300 may be selected as a possible candidate as a new parent step and potential keyword. In other embodiments, operation 260 may continue to operation 225 when the number of most common sequential steps is not greater than one.

The method 200 may continue to build the PKT 600 with potential keywords. In applications such as steps in test scripts, method 200 may be used to create a database (such as the PKT 600) of a common series of steps used among test scripts in a particular system. The PKT 600 may allow for reusability of the steps across test scripts without modifying individual test scripts or creating test scripts from scratch. Method 200 is an example of method 100 of FIG. 1. Operations in method 200 may be added, modified, and removed to achieve the results of method 100. Also, method 100 may be used in other environments besides application testing with test scripts.

FIG. 3 illustrates an elements plain text table (EPTT) 300, according to various embodiments. The elements plain text table (EPTT) 300 may contain the plain text from the steps of the test scripts in the system. The EPTT 300 may be compiled by the set manager. The data from the test scripts included in the EPTT 300 may be a test script in which the plain text of the step resides such as in column 302 (Identifier of the Test script resides in 302), the step number of the plain text in column 304, and the plain text in column 306. Other information about the test scripts may also be included in the EPTT 300. For example, in column 308, the step_UUID which is a direct reference of the test script may be included in the EPTT 300.

The example of the EPTT in FIG. 3 may include a test script A, a test script B, and so on up to a test script X. Test script A may include four plain text entries in rows 310, 312, 314, and 316. Row 310 may include the plain text "Login to RQM." Row 312 may include the plain text "Enter Username." Row 314 may include the plain text "Enter Password." Row 316 may include the plain text "Click Login Button."

Test script B may also include four plain text entries in rows 318, 320, 322, and 324. Row 318 may include the plain text "Login to RQM." Row 320 may include the plain text "Enter Username." Row 322 may include the plain text "Enter Password." Row 324 may include the plain text "Click Login Button."

Test script X may include two plain text entries in rows 326 and 328. Row 326 may include the plain text "Login to RQM." Row 328 may include the plain text "Check Your Balance." It should be noted that the example table shows partial data here. Ie. Test script B will contain steps from 1 to 11 of which only steps 8-11 are shown in this table. Similarly for Test script X total steps maybe 1-22 or more than 22 of which only 21 and 22 are shown in this table.

FIG. 4 illustrates a plain text count table (PTCT) 400, according to various embodiments. The set manager may determine the frequency of each step of plain text from the EPTT 300, enter, and arrange data in the PTCT 400. The PTCT 400 may have column 402, which may include the plain text from each step of the test scripts. Column 404 may be the count of the number of steps containing each plain text of the test scripts. The set manager may arrange the results in the PTCT 400 from the most common step to the least common step.

In the example, the most common plain text in the EPTT 300 is "Login to RQM". The set manager may count the number of times that "Login to RQM" appears throughout the system of test scripts. "Login to RQM" may be found in test script A according to row 308 of EPTT 300, test script B according to row 316, and test script X according to row 324. Therefore, the step "Login to RQM" appears three times throughout the system of test scripts. In row 408 of the PTCT 400, the "Login to RQM" may appear in the plain text column 402 and a count of "3" may be in the count column 404. In row 410, the plain text of the next most common step may be entered, which may be "Enter Username" with a count of two. In row 412, "Enter Password" may be the next most common step with a count of two. In row 414, "Click Login Button" may be the next most common step with a count of two. In row 416, "Check Your Balance" may be the least most common step with a count of one.

FIG. 5 illustrates a keyword reference links table (KRLT) 500, according to various embodiments. After the set manager, determines that "Login to RQM" is the most common step, that it is not part of a potential keyword, and the count of "Login to RQM" is greater than one, then the set manager may create a new potential keyword identifier in the PKT 600 of FIG. 6 and extract all of the most common steps from the EPTT 300 to the KRLT 500. The KRLT 500 may contain information of the steps containing the most common frequent text. Column 502 may contain the potential keyword identifier. Column 504 may contain the test script to which the step belongs. Column 506 may be the keyword row number, which may be the order of steps of plain text extracted into the KRLT 500. Column 508 may be the Step Number which may be the order of the step placed in the EPTT 300. The keyword row number and the step number may be used to order the plain text in the PKT 600. Since "Login to RQM" is the most common step each step containing the plain text "Login to RQM" may be extracted into the KRLT 500. In row 510, the step in test script A may be extracted containing "Login to RQM" may be extracted. In row 512, the step in test script B maybe be extracted and in row 514, the step in test script X may be extracted.

FIG. 6 illustrates the potential keywords table (PKT) 600, according to various embodiments. The PKT 600 may include in column 602 the potential keyword identifier. Column 604 may contain the keyword name. Column 606 may include the content such as the steps under the keyword name. The first potential keyword identifier "1" may have been created when the most common step was determined from the EPTT 300. After extracting all of the steps of the most common steps into the KRLT 500, the parent plain text may be used as the keyword name such as "Login to RQM". Also, the plain text content of the step may be placed in the content column, column 606.

After the most common step has been entered into the PKT 600, the most common sequential step following the most common (parent) step may be determined. The set manager may extract all of the steps directly after each step that contains "Login to RQM" in the EPTT 300. In various embodiments, the set manager may create an in-memory map of the sequential steps also referred to as children. The map may contain a key which may contain the plain text and a value which may be a linked list, which may include the test script and step number. In the illustrated example the map may look like [Enter Username]->[A,2]->[B,9]; [Check Your Balance]->[X,22]. The set manager may obtain the key that has a maximum value count which is [Enter Username] and discard the other keys. The data concerning "Enter Username" may be extracted into the KRLT 500 as shown in row 516 and 518. Also, in the PKT 600, the content of potential keyword identifier "1" may be updated with the "Enter Username" plain text.

The set manager may repeat the process for determining the next most common sequential step after the step "Enter Username" and so on until the next most common sequential step has a count of one or less. Doing so may build the potential keyword identifier "1" with content "Enter Password" and "Click Login Button" in the PKT 600. Also, the KRLT 500 may include the added data in rows 520, 522, 524, and 526. The potential keyword identifier "1" may be the largest common series of statements from a plurality of different sets of ordered statements. "Login to RQM" may be the keyword name and stored in a database such as the potential keywords table with other keywords. This database of common steps may allow for ease in modifying and adding test scripts within a system.

Figure 7:
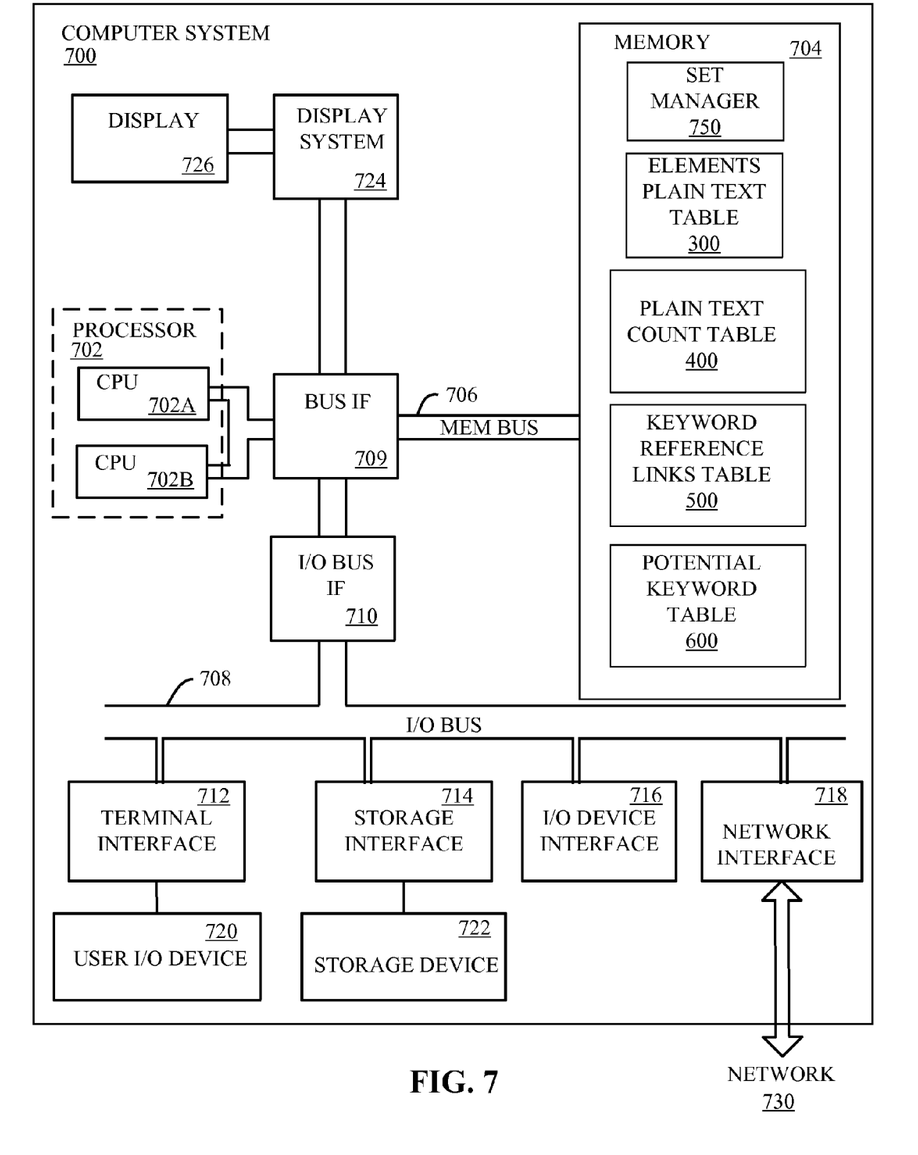
FIG. 7 is intended to depict the representative major components of the computer system, according to various embodiments.

FIG. 7 is a schematic block diagram illustrating one embodiment of a computer system 700. The computer system 700 is one exemplary context in which embodiments may be implemented. The mechanisms and apparatus of the various embodiments disclosed herein apply equally to any appropriate computing system. The major components of the computer system 700 include one or more processors 702, a memory 704, a terminal interface 712, a storage interface 714, an Input/Output ("I/O") device interface 716, and a network interface 718, all of which are communicatively coupled, directly or indirectly, for inter-component communication via a memory bus 706, an I/O bus 708, bus interface unit ("IF") 709, and an I/O bus interface unit 710.

The computer system 700 may contain one or more general-purpose programmable central processing units (CPUs) 702A and 702B, herein generically referred to as the processor 702. In an embodiment, the computer system 700 may contain multiple processors; however, in another embodiment, the computer system 700 may alternatively be a single CPU system. Each processor 702 executes instructions stored in the memory 704 and may include one or more levels of on-board cache.

In an embodiment, the memory 704 may include a random-access semiconductor memory, storage device, or storage medium (either volatile or non-volatile) for storing or encoding data and programs. In another embodiment, the memory 704 represents the entire virtual memory of the computer system 700, and may also include the virtual memory of other computer systems coupled to the computer system 700 or connected via a network 730. The memory 704 is conceptually a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 704 may store all or a portion of the following: set manager 750, elements plain text table 300, plain text count table 400, keyword reference links table 500, and potential keyword table 600. These programs and data structures are illustrated as being included within the memory 704 in the computer system 700, however, in other embodiments, some or all of them may be on different computer systems and may be accessed remotely, e.g., via a network 730. The computer system 700 may use virtual addressing mechanisms that allow the programs of the computer system 700 to behave as if they only have access to a large, single storage entity instead of access to multiple, smaller storage entities. Thus, while the set manager 750, elements plain text table 300, plain text count table 400, keyword reference links table 500, and potential keyword table 600 are illustrated as being included within the memory 704, these components are not necessarily all completely contained in the same storage device at the same time. Further, although the set manager 750, elements plain text table 300, plain text count table 400, keyword reference links table 500, and potential keyword table 600 are illustrated as being separate entities, in other embodiments some of them, portions of some of them, or all of them may be packaged together.

In an embodiment, the set manager 750, elements plain text table 300, plain text count table 400, keyword reference links table 500, and potential keyword table 600 may include instructions or statements that execute on the processor 702 or instructions or statements that are interpreted by instructions or statements that execute on the processor 702 to carry out the functions as further described below. In another embodiment, the set manager 750, elements plain text table 300, plain text count table 400, keyword reference links table 500, and potential keyword table 600 may be implemented in hardware via semiconductor devices, chips, logical gates, circuits, circuit cards, and/or other physical hardware devices in lieu of, or in addition to, a processor-based system. In an embodiment, the set manager 750, elements plain text table 300, plain text count table 400, keyword reference links table 500, and potential keyword table 600 may include data in addition to instructions or statements.

The computer system 700 may include a bus interface unit 709 to handle communications among the processor 702, the memory 704, a display system 724, and the I/O bus interface unit 710. The I/O bus interface unit 710 may be coupled with the I/O bus 708 for transferring data to and from the various I/O units. The I/O bus interface unit 710 communicates with multiple I/O interface units 712, 714, 716, and 718, which are also known as I/O processors (IOPs) or I/O adapters (IOAs), through the I/O bus 708. The display system 724 may include a display controller, a display memory, or both. The display controller may provide video, audio, or both types of data to a display device 726. The display memory may be a dedicated memory for buffering video data. The display system 724 may be coupled with a display device 726, such as a standalone display screen, computer monitor, television, or a tablet or handheld device display. In an embodiment, the display device 726 may include one or more speakers for rendering audio. Alternatively, one or more speakers for rendering audio may be coupled with an I/O interface unit. In alternate embodiments, one or more of the functions provided by the display system 724 may be on board an integrated circuit that also includes the processor 702. In addition, one or more of the functions provided by the bus interface unit 709 may be on board an integrated circuit that also includes the processor 702.

The I/O interface units support communication with a variety of storage and I/O devices. For example, the terminal interface unit 712 supports the attachment of one or more user I/O devices 720, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 720 and the computer system 700, and may receive output data via the user output devices. For example, a user interface may be presented via the user I/O device 720, such as displayed on a display device, played via a speaker, or printed via a printer.

The storage interface 714 supports the attachment of one or more disk drives or direct access storage devices 722 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 722 may be implemented via any type of secondary storage device. The contents of the memory 704, or any portion thereof, may be stored to and retrieved from the storage device 722 as needed. The I/O device interface 716 provides an interface to any of various other I/O devices or devices of other types, such as printers or fax machines. The network interface 718 provides one or more communication paths from the computer system 700 to other digital devices and computer systems; these communication paths may include, e.g., one or more networks 730.

Although the computer system 700 shown in FIG. 7 illustrates a particular bus structure providing a direct communication path among the processors 702, the memory 704, the bus interface 709, the display system 724, and the I/O bus interface unit 710, in alternative embodiments the computer system 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 708 are shown as single respective units, the computer system 700 may, in fact, contain multiple I/O bus interface units 710 and/or multiple I/O buses 708. While multiple I/O interface units are shown, which separate the I/O bus 708 from various communications paths running to the various I/O devices, in other embodiments, some or all of the I/O devices are connected directly to one or more system I/O buses.

In various embodiments, the computer system 700 is a multi-user mainframe computer system, a single-user system, or a server computer or similar device that has little or no direct user interface, but receives requests from other computer systems (clients). In other embodiments, the computer system 700 may be implemented as a desktop computer, portable computer, laptop or notebook computer, tablet computer, pocket computer, telephone, smart phone, or any other suitable type of electronic device.

FIG. 7 is intended to depict the representative major components of the computer system 700, according to various embodiments. Individual components, however, may have greater complexity than represented in FIG. 7, components other than or in addition to those shown in FIG. 7 may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While this disclosure has described the details of various embodiments shown in the drawings, these details are not intended to limit the scope of the invention as claimed in the appended claims.

The invention claimed is:

1. A computer implemented method for determining a largest common series of statements from one or more sets of ordered statements comprising:
   compiling, in a first Elements Plain Text Table (EPTT), each statement from the one or more sets of ordered statements, wherein each statement comprises a portion of plain text computer program code;
      wherein each EPTT comprises a respective script identifier, a respective script direct reference, a respective step number, and a plain text corresponding to each respective statement;
   recording, in a first Plain Text Count Table (PTCT) and based on the first EPTT, a respective number of appearances of each respective statement;
   determining, based on the first PTCT, a statement having a largest number of appearances;
   compiling, in a second EPTT, each respective statement following the statement having a largest number of appearances, wherein each statement following the statement having a largest number of appearances comprises a first order sequential statement;
      wherein each respective first order sequential statement comprises a statement in the first EPTT having a respective step number sequential to and greater than a respective step number of the statement having a largest number of appearances;
   recording, in a second PTCT and based on the second EPTT, a respective number of appearances of each first order sequential statement;
   determining, based on the second PTCT, a first order sequential statement having a largest number of appearances following the statement having a largest number of appearances; and
   storing each appearance of the statement having a largest number of appearances and the first order sequential statement having a largest number of appearances in a Keywords Reference Links Table (KRLT) as the largest common series;
      wherein the KRLT comprises a respective potential keyword ID, a respective script, a respective keyword row number, and a respective script step number for each respective appearance.

2. The computer implemented method of claim 1, further comprising:
   assigning a keyword to the largest common series.

3. The computer implemented method of claim 1, further comprising:
   determining a second statement having a largest number of appearances based on the first EPTT that has not been stored in the KRLT;
   determining a first order sequential statement having a largest number of appearances following the second statement having a largest number of appearances; and
   storing each appearance of the second statement having a largest number of appearances and the first order sequential statement having a largest number of appearances in the KRLT as the second largest common series.

4. The computer implemented method of claim 1, further comprising creating a new set with the largest common series.

5. The computer implemented method of claim 1, wherein the one or more sets are one or more test scripts and the statements are steps of test scripts.

6. The computer implemented method of claim 1, further comprising:
   determining a second order sequential statement having a largest number of appearances based on a third PTCT, wherein a third EPTT catalogs each statement having a respective step number sequential to and greater than a respective step number of the first order sequential statement, wherein the third PTCT records a respective number of appearances of each statement based on the third EPTT; and
   storing each appearance of the statement having a largest number of appearances, the first order sequential statement having a largest number of appearances, and the second order sequential statement having a largest number of appearances in the KRLT as the largest common series.

7. The computer implemented method of claim 2, wherein determining a sequential statement having a largest number of appearances from a previous sequential statement and storing each appearance of the sequential statement in the KRLT is repeated for sequential statements that appear more than once in the one or more sets of ordered statements.

8. A computer system for determining a largest common series from one or more sets of ordered statements, the computer system comprising:
- a hardware processor; and
- a memory communicatively coupled to the processor, wherein the memory is not a transitory signal per se, wherein the memory is encoded with instructions, and wherein the instructions when executed by the processor include:
  - compiling, in a first Elements Plain Text Table (EPTT), each statement from one or more sets of ordered statements, wherein each statement comprises a portion of plain text computer program code;
    - wherein each EPTT comprises a respective script identifier, a respective script direct reference, a respective step number, and a plain text corresponding to each respective statement;
  - recording, in a first Plain Text Count Table (PTCT) and based on the first EPTT, a respective number of appearances of each respective statement;
  - determining, based on the first PTCT, a statement having a largest number of appearances;
  - compiling, in a second EPTT, each statement following the statement having a largest number of appearances, wherein each statement following the statement having a largest number of appearances comprises a first order sequential statement;
    - wherein each respective first order sequential statement comprises a statement in the first EPTT having a respective step number sequential to and greater than a respective step number of the statement having a largest number of appearances;
  - recording, in a second PTCT, a number of appearances of each first order sequential statement;
  - determining, based on the second PTCT, a first order sequential statement having a largest number of appearances following the statement having a largest number of appearances; and
  - storing each appearance of the statement having a largest number of appearances and the first order sequential statement having a largest number of appearances in a Keywords Reference Links Table (KRLT) as the largest common series;
    - wherein the KRLT comprises a respective potential keyword ID, a respective script, a respective keyword row number, and a respective script step number for each respective appearance.

9. The computer system of claim 8, wherein the instructions when executed by the processor further include:
- assigning a keyword to the largest common series.

10. The computer system of claim 8, wherein the instructions when executed by the processor further include:
- determining a second statement having a largest number of appearances in the one or more sets of ordered statements that has not been stored in the KRLT;
- determining a first order sequential statement having a largest number of appearances following the second statement having a largest number of appearances; and
- storing the second statement having a largest number of appearances and the first order sequential statement having a largest number of appearances in a second KRLT as the second largest common series.

11. The computer system of claim 8, wherein the one or more sets are one or more test scripts and the statements are steps of test scripts.

12. The computer system of claim 8, further comprising creating a new set that includes the largest common series.

13. The computer system of claim 8, wherein the instructions when executed by the processor further include:
- determining a second order sequential statement having a largest number of appearances based on a third PTCT, wherein a third EPTT catalogs each statement having a respective step number sequential to and greater than a respective step number of the first order sequential statement, wherein the third PTCT records a respective number of appearances of each statement based on the third EPTT; and
- storing each appearance of the statement having a largest number of appearances, the first order sequential statement having a largest number of appearances, and the second order sequential statement having a largest number of appearances in the KRLT as the largest common series.

14. The computer system of claim 13, wherein determining a sequential statement having a largest number of appearances from a previous sequential statement and storing each appearance of the sequential statement in the KRLT is repeated for sequential statements that appear more than once in the one or more sets of ordered statements.

15. A computer program product for determining a largest common series of statements from one or more sets of ordered statements, the computer product comprising a computer readable storage medium having program code embodied therewith, wherein the computer readable storage medium is not a transitory signal per se, the program code executable by a computer to:
- compile, in a first Elements Plain Text Table (EPTT), each statement from the one or more sets of ordered statements, wherein each statement comprises a portion of plain text computer program code;
  - wherein each EPTT comprises a respective script identifier, a respective script direct reference, a respective step number, and a plain text corresponding to each respective statement;
- record, in a first Plain Text Count Table (PTCT) and based on the first EPTT, a respective number of appearances of each respective statement;
- determine, using the first PTCT, a statement having a largest number of appearances;
- compile, in a second EPTT, each statement following the statement having a largest number of appearances, wherein each statement following the statement having a largest number of appearances comprises a first order sequential statement;
  - wherein each respective first order sequential statement comprises a statement in the first EPTT having a respective step number sequential to and greater than a respective step number of the statement having a largest number of appearances;
- record, in a second PTCT, a frequency of each first order sequential statement;
- determine, using the second PTCT, a first order sequential statement having a largest number of appearances following the statement having a largest number of appearances; and
- store each appearance of the statement having a largest number of appearances and the first order sequential statement having a largest number of appearances in a first Keywords Reference Links Table (KRLT) as the largest common series;
  - wherein the KRLT comprises a respective potential keyword ID, a respective script, a respective keyword row number, and a respective script step number for each respective appearance.

16. The computer program product of claim 15, wherein the program code is further executable by a computer to:
create a new set with the largest common series.

17. The computer program product of claim 15, wherein the program code is further executable by a computer to:
determine a second statement having a largest number of appearances in the one or more sets of ordered statements that has not been stored in the first KRLT;
determine a first order sequential statement having a largest number of appearances following the second statement having a largest number of appearances; and
store the second statement having a largest number of appearances and the first order sequential statement having a largest number of appearances in a second KRLT as the second largest common series.

18. The computer program product of claim 15, wherein the one or more sets are one or more test scripts and the statements are steps of test scripts.

19. The computer program product of claim 15, wherein the program code is further executable by a computer to:
determine a second order sequential statement having a largest number of appearances based on a third PTCT, wherein a third EPTT catalogs each respective statement having a respective step number sequential to and greater than the first order sequential statement, wherein the third PTCT records the number of appearances of each respective statement according to the third EPTT; and
store each appearance of the statement having a largest number of appearances, the first order sequential statement having a largest number of appearances, and the second order sequential statement having a largest number of appearances in the first KRLT as the largest common series.

20. The computer program product of claim 19, wherein determining a sequential statement having a largest number of appearances from a previous sequential statement and storing the sequential statement in the KRLT is repeated for sequential statements that appear more than once in the one or more sets of ordered statements.

\* \* \* \* \*